United States Patent [19]
Ceniceros

[11] 3,753,266
[45] Aug. 21, 1973

[54] EDUCATIONAL ORAL HYGIENE DEVICE FOR YOUNG CHILDREN

[76] Inventor: Robert C. Ceniceros, 10 Hazel St., Larkspur, Calif. 94939

[22] Filed: Aug. 3, 1971

[21] Appl. No.: 168,696

[52] U.S. Cl.................. 15/110, 128/359, D83/8 C
[51] Int. Cl. ..................... A46b 15/00, A61j 17/00
[58] Field of Search.................... 15/110; 128/62 A, 128/359, 360; D83/1

[56] References Cited
UNITED STATES PATENTS

| | | | |
|---|---|---|---|
| 1,816,582 | 7/1931 | Heron | 15/110 V X |
| 2,144,408 | 1/1939 | Holmes | 15/110 UX |
| 1,650,200 | 11/1927 | Dougan | 128/62 A |
| 3,109,192 | 11/1963 | Levenson | 15/167 A UX |
| D180,164 | 4/1957 | Tupper | D83/1 |
| 2,338,980 | 1/1944 | Stratton | 128/359 X |

FOREIGN PATENTS OR APPLICATIONS

| | | | |
|---|---|---|---|
| 381,843 | 10/1932 | Great Britain | 128/62 A |
| 374,517 | 6/1932 | Great Britain | 128/359 |

OTHER PUBLICATIONS
Page 101 of Magazine "Gift and Decorative Accessories," July 1971.

*Primary Examiner*—Daniel Blum
*Attorney*—Robert Charles Hill

[57] ABSTRACT

An oral hygiene device is provided with a handle member, a tooth cleaning portion and a teether member. Support members may be provided intermediate the handle member and the teether member.

2 Claims, 4 Drawing Figures

Patented Aug. 21, 1973 3,753,266

ROBERT C. CENICEROS
*INVENTOR.*

BY Robert Charles Hill

ATTORNEY

EDUCATIONAL ORAL HYGIENE DEVICE FOR YOUNG CHILDREN

BACKGROUND OF THE INVENTION

An oral hygiene device is provided with a tooth cleaning portion for the cleaning of teeth and a teether member for the massaging of gums. The oral hygiene device may also be provided with members intermediate a handle member and the teether member to provide additional support for the device as well as to allow easier gripping by the user.

SUMMARY OF THE INVENTION

In spite of all of the many recent advances in the field of dentistry, there is still an urgent need to educate young children to care for their baby teeth with the use of a toothbrush so that when permanent teeth appear, they too will be properly cared for and cleaned, thus avoiding needless cavities and other forms of degradation.

Most all parents have encountered at one time or another some difficulty in instructing and disciplining children in proper oral hygiene habits. Various devices and artifices have been eagerly and with partial success employed by parents and toothbrush manufacturers to overcome this difficulty. To stimulate young children to use toothbrushes, they have been made in different colors and styles, with handles in the form of animals and clowns and the like, and even with a pleasant odoriferous material incorporated therein.

Another important aspect of dental hygiene is the massaging of the gums. The massaging of the gums and various portions of the mouth cavity aids in the treatment of certain ailments and is desirable and exhilarating under normal and healthy conditions, particularly to babies before teeth arrive and when teeth are coming in. Various types of devices and implements have been designed to accomplish this function, including the commonly known teether. But unfortunately heavy reliance on a teether does not automatically lead to the use of a toothbrush once baby teeth are in place.

The oral hygiene device of the present invention solves the above described problems by providing structure which teaches to a baby and/or a child the use of a tooth cleaning apparatus from the time a child is partially or totally edentulous to when teeth are erupted. This invention is a visual exposure of a toothbrush with the mechanics and protection of a teether.

It is the primary object of the present invention to provide a new and improved oral hygiene device.

Another object is to provide an oral hygiene device which is economical to produce and long lasting in usage.

Another object is to provide an oral hygiene device which teaches preventive dentistry in a pleasing manner.

A further object of the invention is to provide structure of the character described which is both educational and safe for a small child.

DESCRIPTION OF THE PREFERRED EMBODIMENT

Figure 2:
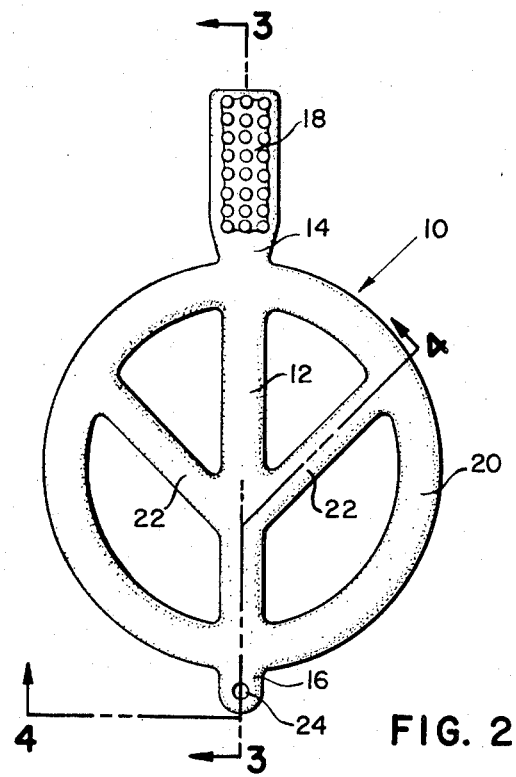
FIG. 2 is a top plan view.
Figure 3:
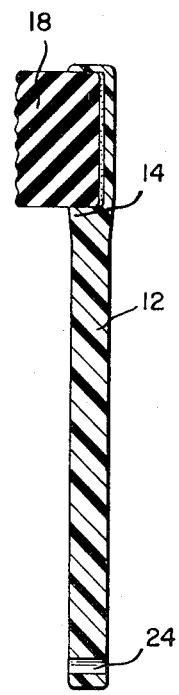
FIG. 3 is a view taken substantially as indicated along line 3—3 of FIG. 2.
Figure 1:
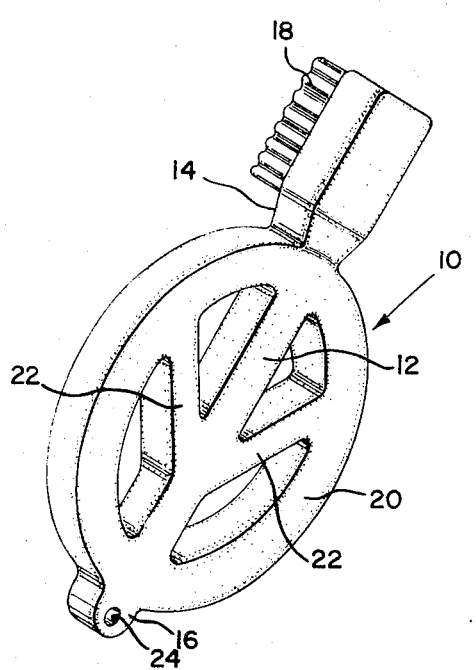
FIG. 1 is a perspective view of the oral hygiene device of the present invention.
Figure 4:
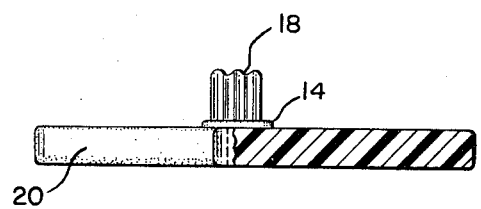
FIG. 4 is a view taken substantially as indicated along line 4—4 of FIG. 2.

Referring to the drawing, there is shown the oral hygiene device of this invention, generally indicated 10, which is intended for use in the mouth to bring about improved dental hygiene in children. The oral hygiene device 10 is provided with a handle member 12 having a front end 14 and a back end 16. A tooth cleaning portion 18 is located on the front end 14. Extending from near the back end 16 of the handle member 12 to near the tooth cleaning portion 18 is teether member 20. While the teether member 20 is illustrated as circular or ring-shaped, it should be understood that other configurations can be used. Intermediate the handle member 12 and the teether member 20 are support members 22 which also allow easier gripping by the user. A suitable aperture 24 is provided in the back end 16 to permit the oral hygiene device to be hung up, if desired, when not in use. The teether member 20 joins the handle member 12 close enough to the tooth cleaning portion 18 so that there is no way that the handle member can be inserted into a child's mouth far enough to cause choking or gaging. In addition, the teether member 20 extends far enough away from the handle member 12 so that the oral hygiene device cannot be swallowed.

The oral hygiene device 10 of this invention can be manufactured from plastic or rubber or the like or any other lightweight durable material suitable for fulfilling safety, educational and practical requirements. The tooth cleaning portion 18 can be bristle or bristle-like, as illustrated, and can be manufactured from rubber or fibers which are either natural or synthetic. As an alternative, the tooth cleaning portion 18 could be a rotary rubber tip or some other suitable structure.

While the oral hygiene device 10 can be manufactured as a one-piece molded unit, it can also be manufactured as a combination of separate members. This latter construction is preferable if it is desired that the handle member 12 be of greater rigidity than the teether member 20.

Various color combinations can also be utilized to improve the appearance of the device and also to ensure that the handle member 12 stands out so as not to distract from the fact that the oral hygiene device of this invention can be used as a toothbrush. As an illustration, the handle member could be dark blue and the rest of the device excluding the tooth cleaning portion 18 could be a pastel or light blue. As another illustration, the handle member could be a solid color and the rest of the device could be transparent.

I claim:

1. An educational oral hygiene device for young children,
   a. a handle member having a front end and a back end;
   b. a tooth cleaning portion on one end of said handle member; and
   c. a ring-shaped teether member extending from said handle member; said teether member extending from near the back end of the handle member to near the tooth cleaning portion and far enough away from the handle member so that said device cannot be swallowed.

2. The oral hygiene device of claim 1 wherein there is at least one support member intermediate the handle member and the teether member.

* * * * *